April 21, 1964 K. D. KROSSA ETAL 3,130,327

ISOLATION CIRCUIT, INCLUDING DIODES AND A RESISTANCE FOR USE IN HIGHLY STABLE TIMING CIRCUITS

Filed May 29, 1961 3 Sheets-Sheet 1

INVENTOR.
KENNETH D. KROSSA
NARSINGH DEO
BY Christie, Parker & Hale
ATTORNEYS.

INVENTOR.
KENNETH D. KROSSA
NARSINGH DEO
BY Christie, Parker & Hale
ATTORNEYS.

INVENTOR.
KENNETH D. KROSSA
NARSINGH DEO
BY Christie, Parker & Hale
ATTORNEYS.

United States Patent Office 3,130,327

Patented Apr. 21, 1964

3,130,327

ISOLATION CIRCUIT, INCLUDING DIODES AND A RESISTANCE FOR USE IN HIGHLY STABLE TIMING CIRCUITS

Kenneth D. Krossa, Sierra Madre, and Narsingh Deo, Pasadena, Calif., assignors to Burroughs Corporation, Detroit, Mich., a corporation of Michigan Filed May 29, 1961, Ser. No. 113,176
8 Claims. (Cl. 307—88.5)

This invention relates to improvements in timing circuits and, more particularly, to a highly stable resistor-capacitor timing circuit having a transistor output.

In many electronic systems, and particularly in digital computers, it is desired to provide accurate timing of pulse signals. A common circuit for providing such timing is a resistor-capacitor timing circuit having a transistor output. In such timing circuits, the transistor is normally in a conducting state and the timing is provided by applying a pulse signal to the resistor-capacitor network which causes the transistor to become nonconducting. The discharge of the capacitor through the resistor of the resistor-capacitor network determines the period of time for which the transistor remains nonconducting and hence determines the time at which the normal output signal of the transistor reappears. This accurate timing of the output signal may then be utilized to precisely actuate other circuits of the computer.

Since timing accuracy is generally of prime importance in the actuation of computer circuits, it is necessary that the timing of the output signal generated by timing circuits, such as that described above, remain constant with changes in environmental conditions such as temperature. As previously mentioned, the timing of the output signal developed by the resistor-capacitor timing circuit is determined by the discharge of the capacitor. Although the major discharge path for the capacitor is the resistor of the resistor-capacitor network, the transistor in a nonconducting condition also provides a discharge path. This is due to the inherent reverse current of the normally conducting transistor when in a nonconducting state. The reverse current of the transistor, normally referred to as $I_{CBO}$, although constant for any given temperature, is extremely sensitive to temperature changes. In particular, for germanium transistors, $I_{CBO}$ approximately doubles for each ten degree (10° C.) increase in temperature. Accordingly, as the temperature of the computer increases due to the normal heating up of its components, the reverse current of the transistor when nonconducting increases. This increase in the reverse current causes the capacitor to discharge more rapidly, thereby decreasing the period of time for which the transistor is nonconducting. Thus, as the temperature of the timing circuit varies, the timing of the output signal produced thereby also varies.

In view of the above, the present invention provides a timing circuit which is highly stable with changes in temperature.

To accomplish this, the present invention in one form provides in combination with a resistor-capacitor timing circuit having an output transistor which is normally conducting, a novel diode-resistor combination which effectively isolates the discharge of the capacitor from the output transistor. Thus, since the transistor does not enter into the discharge path of the capacitor, the effect of the reverse current of the transistor upon the timing of the timing circuit is substantially eliminated.

In particular, the present invention in a basic form includes a first diode connected to a junction of the resistor and the capacitor of the resistor-capacitor network in series with the emitter-base junction of the output transistor. Specifically, the series-connected diode and the emitter-base junction are poled in a like direction. Further, a second diode is coupled in parallel with the emitter-base junction of the transistor, this diode and the emitter-base junction being poled in opposite directions. Coupled to a junction of the diodes is a biasing resistor which is coupled to a source of potential.

Normally, with the transistor conducting, the first diode is forward biased and the second diode is reverse biased. Thus current flows through the first diode and the emitter-base junction in series. When a signal is applied to the resistor-capacitor network to cause the transistor to become nonconducting, the first diode is momentarily reverse biased and the second diode is momentarily forward biased. Due to the resistor-potential source combination, a reverse bias is maintained upon the transistor and a forward bias on the second diode. The forward biasing of the second diode, in turn, limits the reverse bias applied to the transistor thereby protecting the transistor from possible breakdown due to excessive reverse biasing voltage. Due also to the forward biasing of the second diode, the reverse bias is maintained upon the first diode. Thus, in practice, during substantially the entire discharge of the capacitor, the first diode is reverse biased. Accordingly, since a diode may be selected which possesses a reverse current that is many times smaller than that of a transistor, the discharge of the capacitor, for all practical purposes, may be considered as being wholly through the resistor of the resistor-capacitor network. Thus in the present invention, the output transistor is effectively isolated from the capacitor discharge path. Accordingly the effects of changes in transistor reverse current with temperature upon the timing of the output signal are substantially eliminated.

The above as well as other features of the present invention may be more fully understood by reference to the following detailed description when considered with the drawings, in which.

Figure 1:
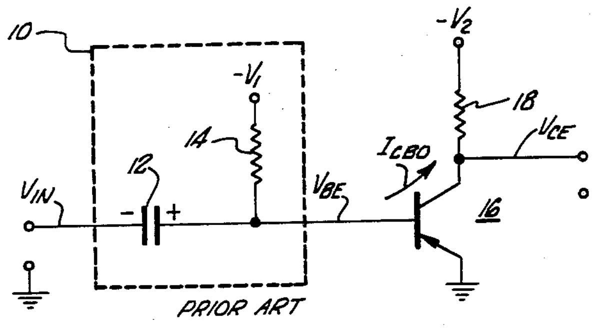
FIGURE 1 is a diagrammatic representation of a resistor-capacitor timing circuit of the prior art.

Referring to FIGURE 1, there is illustrated a well-known type of resistor-capacitor timing circuit having a normally conducting output transistor. As shown, the timing circuit includes a resistor-capacitor network indicated generally by the numeral 10. The network 10 includes a capacitor 12 and a resistor 14, the resistor 14 being coupled to a source of negative potential $-V_1$. As is further represented in FIGURE 1, the network 10 is coupled to an output transistor 16. The output transistor 16 is represented as being arranged in a grounded emitter connection and having an output taken from its collector which is connected to a negative potential $-V_2$ through a resistor 18.

Although the transistor 16 is arranged in a grounded emitter connection, it is to be understood that such a transistor arrangement is merely by way of illustration. In particular, either a grounded base or grounded collector connection might be utilized with corresponding changes in the potentials represented at $-V_1$ and $-V_2$, without departing from the scope of the present invention.

Figure 2:
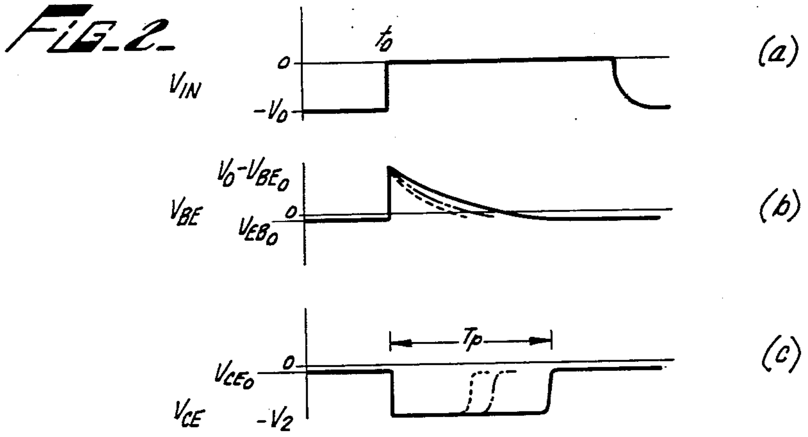
FIGURE 2 is a graphical representation of the wave forms associated with the prior art configuration represented in FIGURE 1.

In operation, as represented by the wave forms in FIGURE 2, the input of the particular resistor-capacitor timing circuit illustrated in FIGURE 1 is normally maintained at a negative potential. Due to the negative potential $-V_1$, the potential at the base of the transistor 16, $V_{BE}$, is normally slightly negative, thereby maintaining the transistor 16 in a normally conducting condition. Further, due to the negative potential $-V_2$ the potential at the collector of the transistor 16, $V_{CE}$, is normally slightly negative.

As represented in FIGURE 2(*b*) when it is desired to generate an accurately timed output signal, a positive input signal is applied to the resistor-capacitor timing circuit at a time $t_0$. Since the voltage across the capacitor 12 cannot change instantaneously, the voltage appearing at the base of the transistor 16 is likewise increased in response to the input signal. The reverse biasing of the transistor 16, causes it to become nonconducting which, in turn, as represented in FIGURE 2(*c*) produces a reduction in the output potential, $V_{CE}$, appearing at the collector of the transistor 16. With the transistor 16 in a nonconducting state, the capacitor 12 primarily discharges through the resistor 14. As represented in FIGURES 2(*b*) and 2(*c*), when the capacitor 12 is substantially discharged and the voltage on the base of the transistor 16 is substantially at its normal negative potential the transistor 16 returns to its normally conducting condition. Accordingly, due to a positive going signal applied to the input of the resistor-capacitor timing circuit, the transistor 16 is caused to be nonconducting for a period of time determined by discharge time of the capacitor 12, this time being indicated in FIGURE 2(*c*) as $T_P$.

Figure 3:
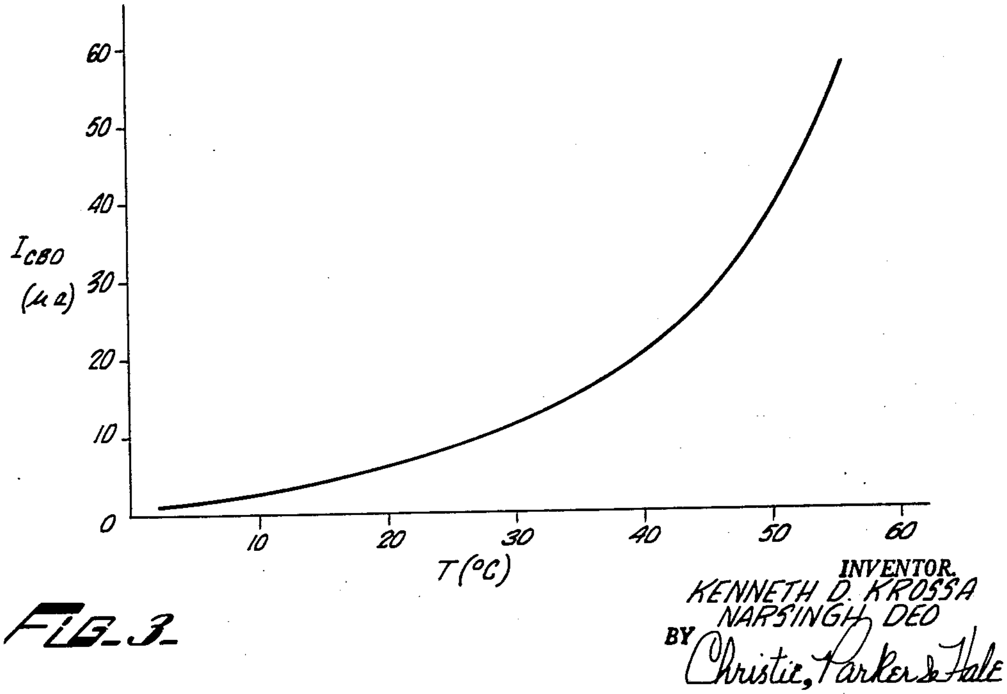
FIGURE 3 is a graphical representation depicting the temperature sensitivity of the reverse current of a transistor with changes in temperature.

Since it is desired that the timing provided by the resistor-capacitor timing circuit be highly accurate, it is necessary that the time duration, $T_P$, for which the transsistor 16 is nonconducting remain constant with environmental changes. As previously noted, however, the discharge of the capacitor 12, although primarily through the resistor 14, is also through the transistor 16 in a nonconducting condition. This is due to the inherent reverse current of a normally conducting transistor when in a nonconducting state. Accordingly, a portion of the charge on the capacitor 12 leaks off through the collector of the transistor 16, through the resistor 18 to the potential source $-V_2$. Although the reverse current indicated as $I_{CBO}$ is constant for any given temperature, it is extremely sensitive to changes in temperature. For example, in germanium transistors, the reverse current approximately doubles for every ten degree (10° C.) variation in temperature. This variation in the reverse current with temperature is depicted in graphical form in FIGURE 3.

Accordingly, if the temperature of the resistor-capacitor timing circuit increases, the reverse current of the transistor 16 likewise increases. The increase in reverse current causes an increase in the discharge of the capacitor 12 through the transistor 16, thereby reducing the discharge time of the capacitor 12, and, hence, the time for which the transistor 16 is nonconducting. In particular, such variations are represented in FIGURES 2(*b*) and 2(*c*) by the dot-dash line and the dotted line, respectively. Thus, with changes in temperature, the timing of the prior art resistor-capacitor timing circuits varies appreciably, which, in turn, produces substantial errors in the timing of other operations in the associated digital computer.

Figure 4:
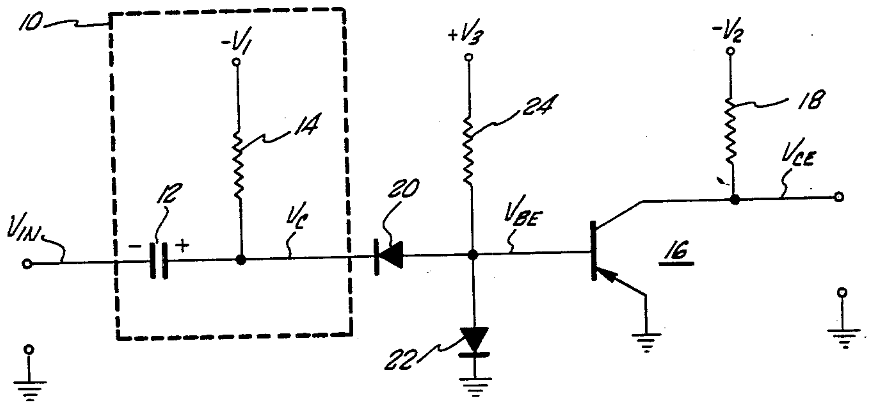
FIGURE 4 is a diagrammatic representation of one form of the present invention.

In view of the above, the present invention provides a highly stable resistor-capacitor timing circuit including a normally conducting output transistor. A basic form of the present invention providing such a stable timing circuit is illustrated in FIGURE 4. As illustrated, to provide a highly stable timing circuit, the present invention includes in combination with the prior art type of timing circuit a novel diode-resistor configuration. In particular, the configuration includes a diode 20 connected to a junction of the capacitor 12 and the resistor 14 in series with the emitter-base junction of the transistor 16. As represented, the diode 20 and the emitter-base junction of the transistor 16 in forming a series current path are poled in a like direction, i.e., the anode of the diode 20 is connected to the base of the transistor 16. Further, coupled in parallel with the emitter-base junction of the transistor 16 is a diode 22. As represented, the diode 22 and the emitter-base junction of the transistor 16 in forming parallel current paths are poled in opposite directions with the anode of the diode 22 connected to the base of the transistor 16. Further, the diode-resistor configuration of the present invention includes a resistor 24 coupled between a junction of diodes 20 and 22 and a source of potential, represented at $V_3$, which, for the grounded emitter connection of the transistor 16, is of a positive potential. By proper proportioning of the relative values of the resistors 14 and 24 and the relative magnitude of the potentials $-V_1$ and $+V_3$, the diode 20 and the transistor 16 are normally forward biased, and the diode 22 is reverse biased. Thus current normally flows through the emitter-base junction of the transistor 16 and the diode 20 in series.

Figure 5:
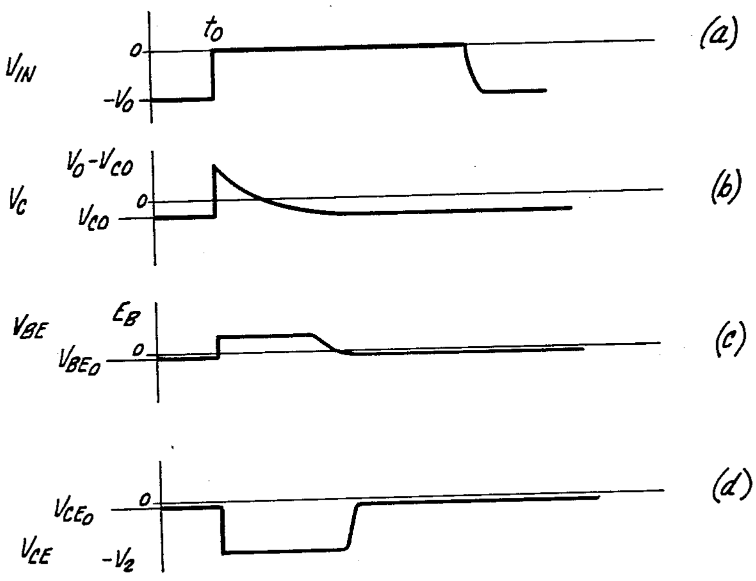
FIGURE 5 is a graphical representation of the wave forms associated with the configuration of FIGURE 4.

In considering the operation of the form of the present invention illustrated in FIGURE 4, reference should be made to the wave forms illustrated in FIGURE 5. When it is desired to produce an accurately timed output signal, a positive going input signal is applied to the input of the network 10. Since the voltage across the capacitor 12 can not change instantaneously, a like positive going change in potential is developed at the junction of the capacitor 12 and the resistor 14. This change in potential is represented as a change in the potential $V_C$, shown in FIGURE 5(*b*). Due to the change in the potential, $V_C$, the diode 20 which is normally forward biased is momentarily reverse biased. Due to the positive potential, $V_3$ the reverse biasing of the diode 20 causes the transistor 16 to be cut off and the diode 22 to be forward biased. The forward biasing of the diode 22 limits the reverse biasing of the emitter-based junction of the transistor 16 at $E_B$ and maintains the reverse bias on the diode 20.

With the transistor 16 cut off and the diode 20 reverse biased, the capacitor 12 discharges. However, since the diode 20, which may be a silicon diode, when reverse biased possesses a substantially zero reverse current, the discharge of the capacitor 12 may be considered as being completely through the resistor 14. Thus, the discharge of the capacitor 12 is isolated from the reverse current path of the transistor 16. Accordingly, variations in temperature surrounding the resistor-capacitor circuit of the present invention have little effect upon the discharge of the capacitor 12 and hence upon the period of time, $T_P$, for which the transistor 16 is nonconducting.

Thus, by combination of the diode-resistor configuration of the present invention with a resistor-capacitor timing circuit, a highly stable timing circuit results.

Although the present invention has been described in reference to a grounded emitter transistor connection, it is to be understood that the present invention is not limited thereto. In particular the present invention is equally applicable to grounded base and grounded collector connections, it being clearly within the purview of a man skilled in the art to reverse the diodes 20 and 22 as well as the polarity of the potential sources $V_1$, $V_2$, and $V_3$ to produce the desired isolation of the discharge of the capacitor 12 from the reverse current path of the transistor 16. In providing such adaptation, however, it is to be noted that certain features of the present invention are common to all transistor connections. In particular the series diode 20 should be poled in a like direction with the emitter-base junction of the transistor and the parallel connected diode 22 should be poled in in an opposite direction to the emitter-base junction of the transistor. Further, for all connections of the transistor 16, the resistor 24 and the potential connected thereto provide reverse biasing to cut off the transistor 16 while the diode 22 limits the value of the reverse biasing upon the transistor 16, thereby preventing any breakdown of the transistor 16, which might occur due to a high reverse biasing of the transistor 16, and maintains a reverse bias upon the series diode 20 when the transistor 16 is nonconducting.

Although, as described thus far, the present invention is generally applicable to resistor-capacitor timing circuits having a transistor output, the present invention is particularly useful in multivibrator configurations. Specifically when utilized in a monostable multivibrator, a multivibrator is produced which is highly stable with changes in temperature. Such a multivibrator configuration including the present invention is depicted in FIGURE 6.

Figure 6:
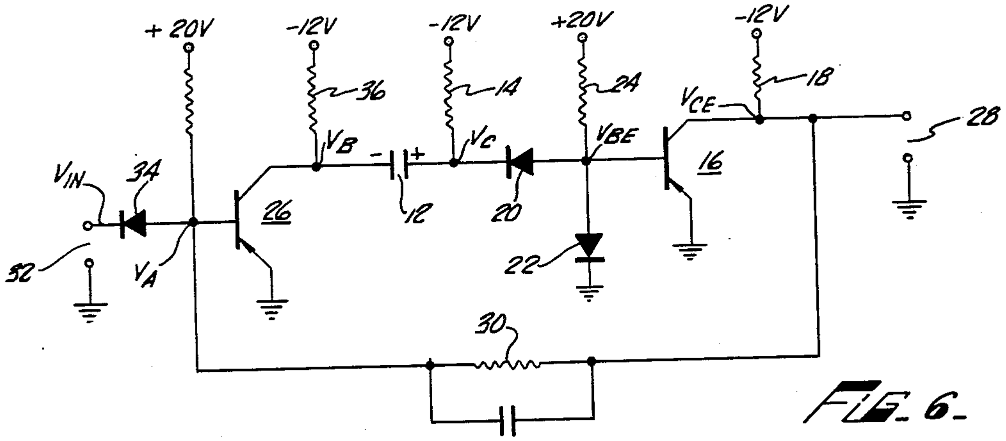
FIGURE 6 is a diagrammatic representation of a monostable multivibrator utilizing the concepts of the present invention.

As illustrated in FIGURE 6, the multivibrator includes an input transistor 26 which, by way of example, is arranged in a grounded emitter connection. As represented, due to the biasing on the base of the transistor 26 as well as upon its collector, the transistor 26 is normally biased to a nonconducting state.

To provide an accurate timing for the multivibrator circuit, a resistor-capacitor timing circuit of the present invention is included between the collector of the transistor 26 and the output of the multivibrator represented at 28.

To provide a regenerative feedback path for the multivibrator, a parallel resistor-capacitor circuit represented at 30 is connected between the collector of the transistor 16 and the base of the transistor 26.

From the above as well as from reference to the relative magnitudes of the potentials applied to the multivibrator, with the multivibrator in its normal condition, the transistor 26 is nonconducting and the transistor 16 is conducting. More specifically, the initial conditions at the various points in the multivibrator, namely, the base and collector of the transistor 26, the cathode of the diode 20, and the base and the emitter of the transistor 16, are substantially as represented in graphical form in FIGURE 7.

Figure 7:
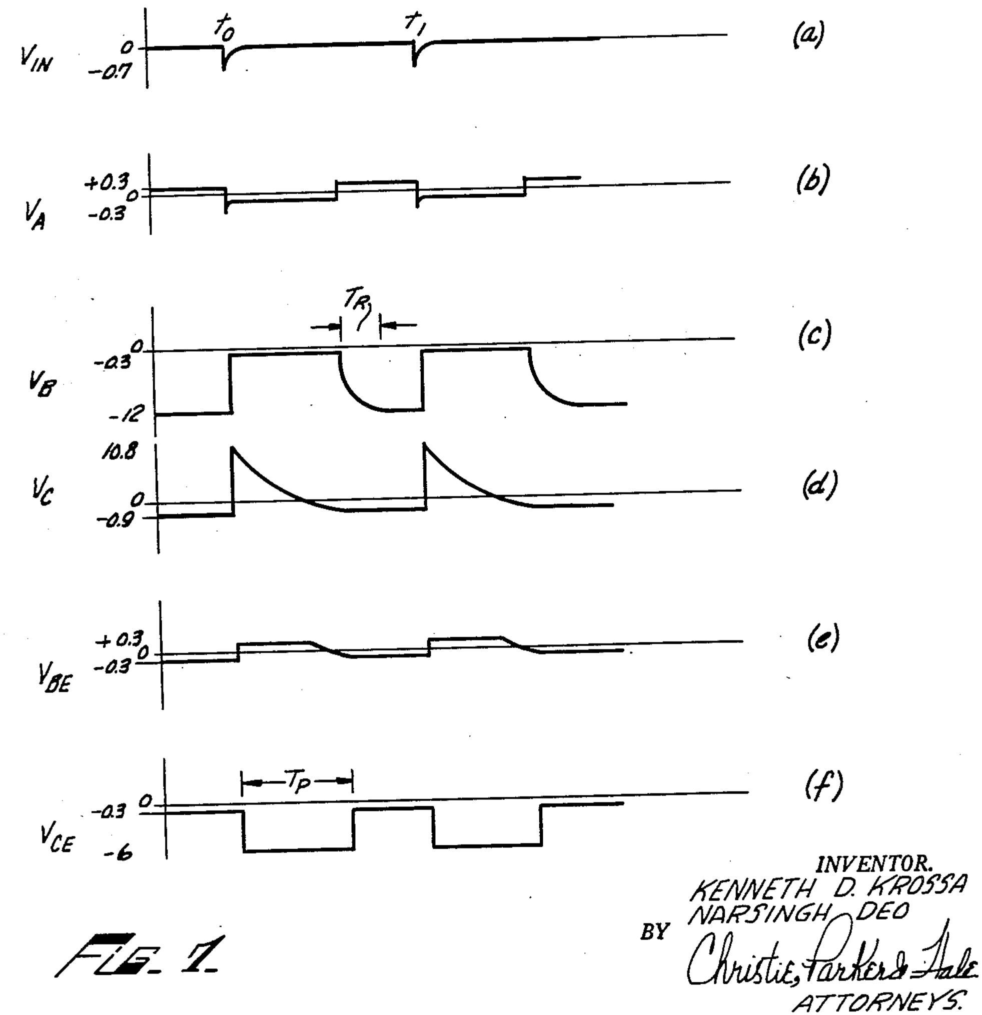
FIGURE 7 is a graphical representation of the wave forms associated with the multivibrator illustrated in FIGURE 6.

To excite the multivibrator represented in FIGURE 6, a negative pulse is applied between the input terminals represented at 32 to a series-connected diode 34. As represented in FIGURE 7(*b*), this causes the potential at the base of the transistor 26 to instantaneously go negative, thereby causing the transistor 26 to become conducting. With the transistor 26 conducting, the potential $V_B$ at the collector of the transistor 26 becomes less negative. Since the voltage across the capacitor 12 cannot increase instantaneously, the voltage change at the collector of the transistor is reflected at the cathode of the diode 20. This is represented in FIGURE 7(*d*) by the positive going change of the potential $V_C$.

Due to the rise in $V_C$, the series diode 20 is caused to be reverse biased. With the diode 20 reverse biased, the potential coupled to the resistor 24 causes the transistor 16 to be cut off and the diode 22 to be forward biased. As represented in graphical form in FIGURE 7(*f*) cutting off the transistor 16 results in the potential developed at its collector going more negative, while as represented in FIGURE 7(*e*), the forward biasing of the diode 22 limits the reverse biasing of the base-emitter junction of the transistor 16 and maintains a reverse bias upon the diode 20.

With the transistor 16 cut off and the diode 20 reverse biased, the capacitor 12 discharges, the discharge being graphically represented in FIGURE 7(*d*). Due to the reverse biasing maintained upon the diode 20, the discharge path of the capacitor 12 is isolated from the transistor 16, the capacitor 12 discharging through the resistor 14.

When the voltage at the cathode of the series diode 20 becomes negative, the diode 20 begins to conduct, this being represented by the curved portion of the wave form represented in FIGURE 7(*e*). When the cathode of the diode 20 and the base of the transistor 16 reach their normal negative values, the transistor 16 returns to a conductive condition, thereby causing the potential to become less negative at the collector of the transistor 16.

Accordingly, as represented by the wave forms in FIGURE 7, a negative pulse applied to the base of the transistor 26 causes the transistor 26 to become conducting, which in turn causes the transistor 16 to be nonconducting. Due to the reverse biasing of the diode 20 when the transistor 16 is nonconducting, the capacitor 12 discharges through the resistor 14, the time of discharge of the capacitor 12 determining the timing of the monostable multivibrator. Further when the transistor 16 returns to a conducting state, the potential at the collector of the transistor 16 becomes less negative. This change in potential, represented in FIGURE 7(*f*), is reflected through the regenerative feedback path to the base of the transistor 26, thereby cutting off the transistor 26.

When the transistor 16 is again conducting, the capacitor 12 is in a discharged condition and requires a period of time to recharge to its normal state. This recharge time is represented in FIGURE 7(*c*) as $T_R$. The resetting time of the multivibrator is determined by the value of the resistor 36 which is connected to the collector of the transistor 26. With the capacitor 12 recharged, another negative pulse may be applied to the multivibrator which in response thereto repeats its timed operation.

From the above it appears that due to a utilization of the present invention as the timing circuit in the monostable multivibrator, the resetting time of the multivibrator becomes invariant with changes in the temperature. Further, due to the addition of the present invention, the possibility of breakdown of the output transistor is prevented since, when the output transistor is cut off the value of the reverse bias on the base-emitter junction is limited by the forward biased parallel connected diode 22.

What is claimed is:

1. A highly stable timing circuit comprising: a capacitor; a first resistor coupled to said capacitor; a transistor including an emitter-base junction; a first diode connected to a junction of said first resistor and said capacitor in series with said emitter-base junction, said first diode and said emitter-base junction being poled in a like direction for series current flow; means including said first resistor for forward biasing the emitter-base junction of said transistor and said first diode to a normally high conductive state, said transistor being switched to a nonconductive state by a signal applied to said capacitor; means including a second resistor coupled to a junction of said first diode and said emitter-base junction for reverse biasing the emitter-base junction of said transistor when said transistor is in a nonconductive state; and a second diode coupled in parallel with said emitter-base junction, said second diode and said emitter-base junction being poled in opposite directions for parallel current flow to limit the reverse biasing of the emitter-base junction of said transistor and to maintain a reverse bias on said first diode when said transistor is in a nonconductive state, said transistor remaining in a nonconductive state for a period of time determined by the time constant of said capacitor and said first resistor.

2. A highly stable timing circuit comprising: a capacitor; a first resistor coupled to said capacitor; a transistor including an emitter-base junction; a first unidirectionally conductive device coupled to a junction with said first resistor and said capacitor in series with said emitter-base junction, said first unidirectionally conductive device and said emitter-base junction being poled in a like direction for series current flow; a second unidirectionally conductive device coupled in parallel with said emitter-base junction, said second unidirectionally conductive device and said emitter-base junction being poled in opposite directions for parallel current flow; means including said first resistor for forward biasing the emitter-base junction of said transistor and said first unidirectionally conductive device such that said transistor is normally conducting; and means including a second resistor coupled to a junction of said first and second unidirectionally conductive devices for reverse biasing the emitter-base junction of said transistor when said transistor is nonconducting in response to a signal applied to said capacitor, said transistor remaining nonconducting for a period determined by said capacitor and said first resistor.

3. In a timing circuit which comprises a capacitor, a resistor coupled to said capacitor, an output transistor having an emitter-base junction coupled to a common connection between said resistor and said capacitor, said transistor being forward biased to a normally conducting state by means including said resistor and being responsive to signals applied to said capacitor to switch to a nonconducting state for a period of time determined by said capacitor and said resistor, the combination of: a first unidirectionally conducive device coupled to said common connection between said resistor and said capacitor, said first device being connected in series with said emitter-base junction, said first unidirectionally conductive device and said emitter-base junction being poled in a like direction for series current flow; means coupled to a common connection between said first unidirectionally conductive device and said emitter-base junction for maintaining a reverse bias on said transistor in response to a signal applied to said capacitor; and a second unidirectionally conductive device coupled in parallel with said emitter-base junction, said second unidirectionally conductive device and said emitter-base junction being poled in opposite directions to limit the reverse bias on said transistor and to maintain a reverse bias on said first unidirectionally conductive device when said transistor is in a nonconducting state.

4. The combination defined in claim 3 wherein said first and second unidirectional conductive devices are first and second diodes, respectively.

5. In the resistance-capacitance timing circuit of a multivibrator having a normally conducting output transistor, the combination of: a first diode coupled to a junction of the resistor and the capacitor of the resistance-capacitance timing circuit in series with the emitter-base junction of the normally conducting output transistor, said diode and said emitter-base junction being poled in a like direction for series current flow; a second diode coupled in parallel with said emitter-base junction, said second diode and said emitter-base junction being poled in opposite directions for parallel current flow; and means including a resistor coupled to a junction of said first and second diodes for holding said output transistor in a nonconducting state in response to an input signal.

6. A highly stable monostable multivibrator comprising: an input transistor; means for biasing said input transistor to a normally nonconducting state; a timing circuit including a capacitor connected to said input transistor and a first resistor coupled to said capacitor and a source of potential; an output transistor, said output transistor being biased to a normally conducting state; a first diode coupled to a junction of said capacitor and said resistor in series with the emitter-base junction of said output transistor, said first diode and said emitter-base junction being poled in a like direction for series current flow; a second diode connected in parallel with the emitter-base junction of said output transistor, said second diode and said emitter-base junction being poled in opposite directions; means connected to the junction of said first and second diodes and including a second resistor for maintaining a reverse bias upon said output transistor when said output transistor is nonconducting in response to a switching of said input transistor to a conducting state; and regenerative feedback means coupled between said output transistor and said input transistor.

7. A highly stable timing circuit for generating an output signal of a predetermined time duration in response to a step-like voltage input signal, comprising: a capacitor having first and second terminals, the first terminal being connected to an input terminal for receiving the input voltage signal; a first resistor connected to the capacitor to provide a discharge path for the capacitor; a transistor including an emitter-base junction; a first unidirectional current conductive device coupled between the second terminal of the capacitor and the emitter-base junction, the first device and the emitter-base junction being poled in a like direction to complete a series current path between the emitter-base junction and the input terminal for charging the capacitor; a second unidirectional current conductive device coupled in parallel with the emitter-base junction, the second unidirectional current conductive device and the emitter-base junction being poled in opposite directions; means for forward biasing the emitter-base junction and the first device such that the transistor is normally conducting; and means including a second resistor coupled to a junction of the emitter-base junction and the second device for reverse biasing the first device and the emitter-base junction and for forward biasing the second device when the input signal is applied to the input terminal to cause the transistor to become nonconductive for a period of time determined by the time required for the capacitor to discharge through the first resistor.

8. A highly stable monostable multivibrator, comprising: an input transistor for receiving an input signal; means for biasing the input transistor to a normally nonconducting state to switch to a conducting state in response to the input signal; an output transistor having an emitter-base junction; a capacitor and a first unidirectional current conductive device connected in series and to the input and output transistors, respectively, the first device and the emitter-base junction being poled in a like direction for series current flow to charge the capacitor; means for forward biasing the first device and the emitter-base junction such that the output transistor is normally in a conducting state ready to switch to a nonconducting state in response to the input signal applied to the input transistor; a first resistor coupled to the capacitor to provide a discharge path for the capacitor; a second unidirectional current conductive device connected in parallel with the emitter-base junction, the second device and the emitter-base junction being poled in opposite directions; means including a second resistor connected to a junction of the first and second devices for reverse biasing the emitter-base junction and the first device and for forward biasing the second device in response to the input signal to cause the output transistor to become nonconducting while the capacitor discharges through the resistor; and regenerative feedback means coupled between the output transistor and the input transistor.

References Cited in the file of this patent

UNITED STATES PATENTS

| | | |
|---|---|---|
| 2,870,347 | Jensen | Jan. 20, 1959 |
| 2,873,388 | Trumbo | Feb. 10, 1959 |
| 2,964,653 | Cagle et al. | Dec. 13, 1960 |
| 3,032,714 | Cohen | May 1, 1962 |
| 3,033,994 | Fujimoto et al. | May 8, 1962 |
| 3,068,406 | Dellinger | Dec. 11, 1962 |